US009970821B2

(12) United States Patent
Cook et al.

(10) Patent No.: US 9,970,821 B2
(45) Date of Patent: May 15, 2018

(54) CHARACTERIZATION OF SPECTRAL EMISSIVITY VIA THERMAL CONDUCTIVE HEATING AND IN-SITU RADIANCE MEASUREMENT USING A LOW-E MIRROR

(71) Applicant: Raytheon Company, Waltham, MA (US)

(72) Inventors: Steven F. Cook, Tucson, AZ (US);
Colton L. Noble, Vail, AZ (US);
Justan V. Forsyth, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 482 days.

(21) Appl. No.: 14/688,617

(22) Filed: Apr. 16, 2015

(65) Prior Publication Data
US 2016/0305821 A1    Oct. 20, 2016

(51) Int. Cl.
*G01J 5/00* (2006.01)
*G01J 5/08* (2006.01)

(52) U.S. Cl.
CPC ............... *G01J 5/0003* (2013.01); *G01J 5/00* (2013.01); *G01J 5/0887* (2013.01)

(58) Field of Classification Search
CPC  G01K 7/02; G01K 3/005; G01K 3/10; G01K 7/42; G01K 7/22; G01K 7/10; G01K 11/32; G01K 13/00; G01K 13/02; G01K 2205/04; G01K 2013/024; B23K 31/02; H01R 4/023; H01R 4/029; H01R 43/28; G01F 1/00; G01N 25/72; H05K 7/20945; F24F 11/0012; F24F 2001/0052; F24F 2011/0093; F24F 11/022; H02M 1/32;
(Continued)

(56) References Cited

U.S. PATENT DOCUMENTS 3,698,813 A * 10/1972 Aisenberg ............... G01J 5/524
    374/126
4,645,358 A    2/1987 Blume
(Continued)

OTHER PUBLICATIONS

Barnes et al., :The total Emissivity of Various Materials at 100-500C., Journal of the Optical Society of America, vol. 37, No. 10, Oct. 1, 1947 pp. 804-807.
(Continued)

*Primary Examiner* — Manish S Shah
(74) *Attorney, Agent, or Firm* — Eric A. Gifford (57) ABSTRACT

A high SNR in-situ measurement of sample radiance in a low-temperature ambient environment is used to accurately characterize sample emissivity for transmissive, low-emissivity samples. A low-e mirror is positioned behind the sample such that the sample and low-e mirror overfill the field-of-view (FOV) of the radiometer. The sample is heated via thermal conduction in an open environment. Thermal conduction heats the sample without raising the background radiance appreciably. The low-e mirror presents both a low emission background against which to measure the sample radiance and reflects radiance from the back of the sample approximately doubling the measured signal. The low-e mirror exhibits a reflectance of at least 90% and preferably greater than 98% and an emissivity of at most 7.5% and preferably less than 2% over the spectral and temperature ranges at which the sample emissivity is characterized.

11 Claims, 9 Drawing Sheets

(58) Field of Classification Search
CPC .... H02M 1/38; H02M 1/53806; H01C 7/008; H01C 17/00; G01R 31/2642; G01R 31/048; G01R 31/40; G01J 5/004; G01J 5/043; G01J 5/0821

See application file for complete search history.

(56) References Cited

U.S. PATENT DOCUMENTS

| | | | | |
|---|---|---|---|---|
| 4,845,647 A | * | 7/1989 | Dils | G01J 5/08 374/131 |
| 4,974,182 A | * | 11/1990 | Tank | G01J 5/601 374/9 |
| 5,099,121 A | * | 3/1992 | Allen | G01J 5/602 374/121 |

OTHER PUBLICATIONS

Dai et al., "Fourier transform spectrometer for spectral emissivity measurement in the temperature range between 60 and 1500[deg]C.", Journal of Physics: Conference Series, Institute of Physics Publishing, Bristol, GB, vol. 13, No. 1, Jan. 1, 2005, pp. 63-66.

Rozenbaum et al, :"A spectroscopic method to measure the spectral emissivity of semi-transparent materials up to high temperature", Review of Scientific Instruments, AIP, Melville, NY, US, vol. 70, No. 10, Oct. 1, 1999, pp. 4020-4025.

* cited by examiner

CHARACTERIZATION OF SPECTRAL EMISSIVITY VIA THERMAL CONDUCTIVE HEATING AND IN-SITU RADIANCE MEASUREMENT USING A LOW-E MIRROR

GOVERNMENT LICENSE RIGHTS

The U.S. Government has a paid-up license in this invention and the right in limited circumstances to require the patent owner to license others on reasonable terms as provided for by the terms of contract No. N68936-10-D-0009 awarded by The Department of the Navy.

BACKGROUND OF THE INVENTION

Field of the Invention

This invention relates to the measurement and characterization of the emissivity of objects, and more particularly to emissivity characterization across the MWIR and LWIR spectral bands and from approximately 50 C to 300 C and higher.

Description of the Related Art

Objects at temperatures greater than 0 Kelvin emit electromagnetic energy (light) in some relationship to Planck's Law. If an object emits energy perfectly in accordance with Planck's law, the object is said to be a "blackbody." Emissivity is the measure of how efficiently an object emits energy with respect to Planck's law. Emissivity is a unitless quantity between 0 and 1 computed as the ratio of blackbody radiation to the object's radiation.

For example, if an object emits energy perfectly with respect to Planck's law, its emissivity would be 1. If another object were only 50% efficient at emitting energy with respect to Planck's law, its emissivity would be 0.50. The emissivity properties of a material can vary as a function of the object's temperature and the wavelength at which the energy is emitted.

Understanding this quantity is extremely important to many fields, including infrared imaging, optical design, remote sensing, etc. In the case of infrared imaging, knowing a material's emissivity allows for the calculation of the material's temperature without the use of temperature sensors or thermometers. The optical designer desires optical materials to be made of low emissivity materials that do not give off unwanted energy when hot. Materials with very high emissivity are used as standards or "blackbody simulators" to calibrate remote sensing equipment.

Characterizing the emissivity of a material with high emissivity is relatively straightforward. Characterizing transmissive, low emissivity materials like optical windows or lenses is more difficult, and even harder at high temperatures. The energy emitted from such materials is very low, hence difficult to separate from other sources of radiation such as the heat source, ambient etc.

A method for characterizing the emittance of a transmissive, low emissivity sample involves heating the sample in an oven until it reaches the desired temperature, removing the sample, and using a radiometer to measure the energy emitted by the sample. Once removed, the sample's emissions decrease as a function of temperature. To characterize the emissivity accurately, it is necessary to know the sample's thermometric temperature quite accurately at the precise time the radiometer takes a measurement. This is quite difficult in practice. Furthermore, the cooling process results in an uneven temperature across the sample; further reducing accuracy.

Another method for measuring the emissivity of a sample at high temperatures is to measure the sample radiance in-situ through an optical window in the oven. This eliminates the cooling problems associated with the previous technique, but adds additional problems. To heat the sample, the ambient temperature inside the oven is very high. The oven emits a large amount of energy that tends to overwhelm the miniscule energy emitted by the sample. The sample energy is "in the noise" of the oven emissions, and thus very difficult to extract. The window restricts the wavelengths that the emissivity testing can be conducted over. A specially chosen window must be selected to measure emittance over different wavebands. This prevents broadband or hyper spectral measurements using this technology.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides for a high SNR in-situ measurement of sample radiance in a low-temperature ambient environment to accurately characterize sample emissivity for transmissive, low-emissivity samples.

This is accomplished by heating the sample via thermal conduction in an open environment and placing a low-e (low emissivity) mirror behind the sample such that the sample and low-e mirror overfill the field-of-view (FOV) of the radiometer. Thermal conduction heats the sample without raising the background radiance appreciably and the radiometer does not see emissions from the heat source. The low-e mirror presents both a low emission background against which to measure the sample radiance and reflects radiance from the back of the sample approximately doubling the measured signal. The low-e mirror exhibits a reflectance of at least 90% and preferably greater than 98% and an emissivity of at most 7.5% and preferably less than 2% over the spectral and temperature ranges at which the sample emissivity is characterized. The spectral range will typically include the MWIR, LWIR or both. The temperature range typically spans approximately to at 300 C, 600 C or even 1000 C. For example, a gold coating exhibits a reflectance of 98-99.5% and emissions of 2-0.5% over both the MWIR and LWIR bands and a temperature range that spans at least 50 C to 350 C.

In an embodiment, a low-e mirror is placed between the sample and the surface of a hot plate. A temperature sensor such as a thermocouple or PRT is directly attached to the sample. The sample and low-e mirror overfill the field-of-view (FOV) of the radiometer that measures an ambient radiance, a low-e mirror radiance including contributions from only the low-e mirror and ambient and a sample radiance including contributions from the sample, low-e mirror and ambient. The ambient radiance is subtracted from each of the low-e mirror radiance and sample radiance measurements. The sample radiance itself is computed as the scaled difference between these radiance measurements. The emissivity is then calculated as the ratio of the sample radiance to that of a perfect blackbody emitter. In some cases, the ambient and low-e mirror emissions may be negligible, in which case the actual sample radiance is extracted as approximately one-half the measured sample radiance.

In another embodiment, the sample is mounted directly on the surface of an annular hot plate. A temperature sensor is attached to the sample. A low-e mirror is positioned behind the sample and hot plate. The portion of the sample and low-e mirror inside the annulus (i.e. the hole in the center of the hot plate) overfill the FOV of the radiometer. The same measurements and calculations are made to compute the emissivity of the sample. The advantage of this embodiment is that the low-e mirror either remains at ambient (less emission than at the elevated temperatures of the sample) or can be actively cooled to temperatures far less than ambient (far less emission). Because the low-e mirror remains at ambient (23 C) or lower, the temperature range of the sample can be extended to much higher temperatures.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a method and test assembly for a high SNR in-situ measurement of sample radiance in a low-temperature ambient environment to accurately characterize sample emissivity for transmissive, low-emissivity samples.

Figure 1:
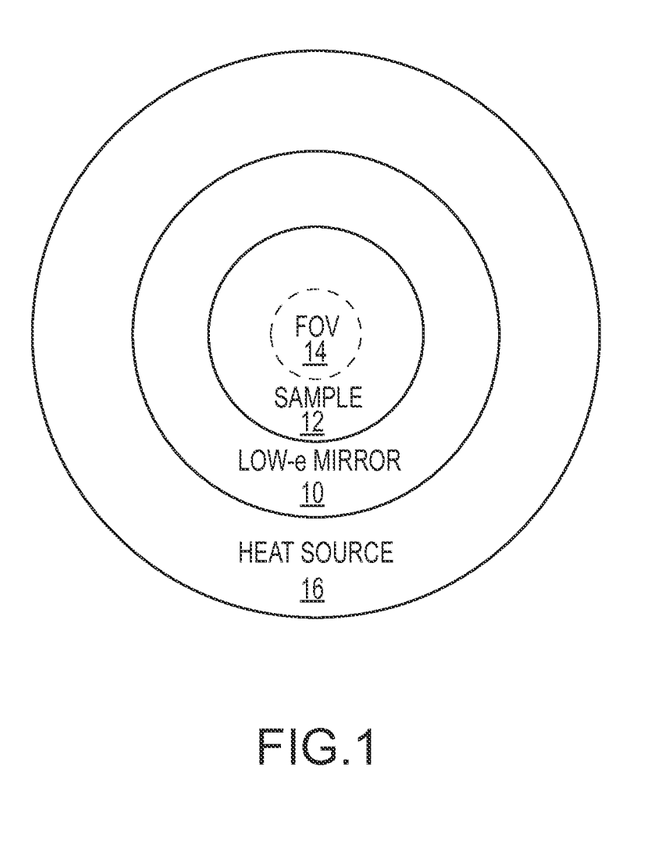
FIG. 1 is a depiction of an embodiment of a low-e mirror placed behind a sample in which the sample is heated via thermal conduction and its radiance is measured in-situ.

Referring now to FIG. 1, the high SNR measurement of sample radiance is achieved by placing a low-e (low emissivity) mirror 10 behind a sample 12 such that the sample and low-e mirror overfill the field-of-view (FOV) 14 of a radiometer and heating sample 12 via thermal conduction from a heat source 16 (e.g., a hot plate) in an open environment. Sample 12 is in thermal contact with heat source 16 (directly or through other thermal conductive components) such that heating is via thermal conduction, not convection or radiation to any appreciable measure. Thermal conduction heats the sample without raising the background radiance appreciably. The low-e mirror 10 presents both a low emission background against which to measure the sample radiance and reflects radiance from the back of the sample approximately doubling the measured signal. The low-e mirror 10 exhibits a reflectance of at least 90% and preferably greater than 98% and an emissivity of at most 7.5% and preferably less than 2% over the spectral and temperature ranges at which the sample emissivity is characterized. The spectral range will typically include the MWIR, LWIR or both. The temperature range typically spans approximately 50 C to 300 C, 600 C or even 1000 C. For example, a gold coating exhibits a reflectance of 98-99.5% and emissions of 2-0.5% over both the MWIR and LWIR bands and a temperature range that spans at least 50 C to about 350 C before it starts to degrade. Other materials such as silver, aluminum or copper may be used. Gold has the advantage that it does not corrode easily, and thus maintains stable transmission properties over time. Other materials may require a protective coating.

Figure 2:
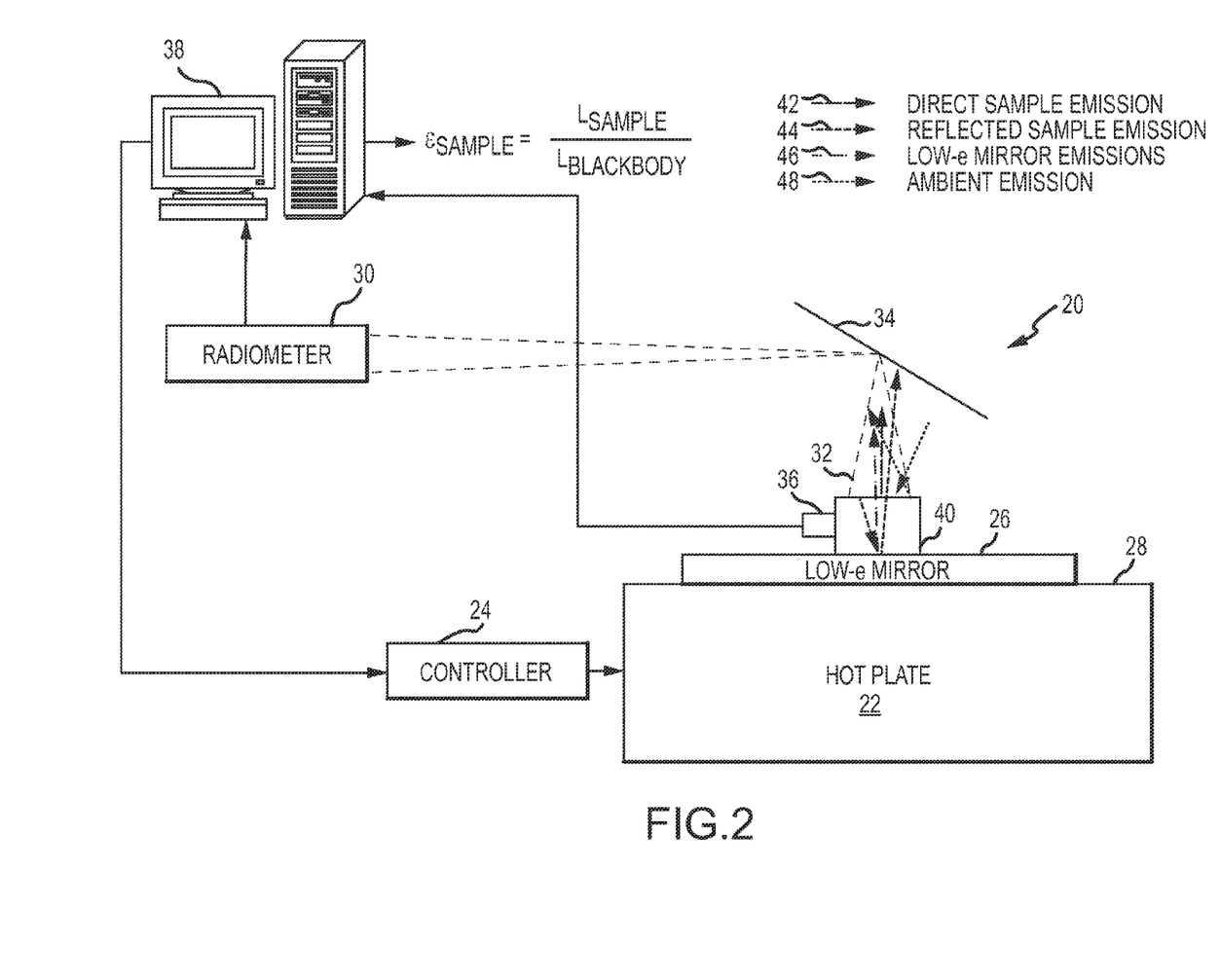
FIG. 2 is a block diagram of a first embodiment of a test assembly for characterizing the emissivity of a transmissive, low-emissivity sample in which the sample is placed on a low-e mirror over a hot plate.

Referring now to FIG. 2, an embodiment of a test and measurement assembly 20 comprises a hot plate 22 and a controller 24 for controlling the temperature of hot plate 22, a low-e mirror 26 placed on a surface 28 of the hot plate, a radiometer 30 such as a Fourier Transform IR (FTIR) radiometer for measuring radiance within a FOV 32 over a spectral band (e.g., MWIR and/or LWIR), a turn mirror 34 for turning the optical path from the hot plate to the radiometer, a temperature sensor 36 and a computer 38 configured to control controller 24, receive temperature and radiance measurements, extract a sample range and compute a sample emissivity a spectral band and temperature range. Turn mirror 34 is not required; it is used for convenience of placing the test equipment.

A sample 40 is placed on low-e mirror 26. Sample 40 and low-e mirror 26 overfill the FOV 32 of the radiometer. Temperature sensor 36 (e.g. a thermocouple or PRT) is attached to sample 40 to measure a sample temperature in-situ. Computer 38 issues command to controller 24 to heat hot plate 22, which in turn heats sample 40 via thermal conduction through low-e mirror 26. In this embodiment, it is preferable that the low-e mirror is thermally conductive, preferably greater than 237 W*m−1*K−. Gold has a thermal conductivity of 318 W*m−1*K. Computer 38 receives a radiance measurement over the FOV and spectral band and a sample temperature taken at the same time as the radiance measurement. Computer 38 extracts sample radiance from the radiance measurement and computes the sample emissivity over the spectral band. The computer repeats this process in increments over a temperature range, typically from approximately 50 C to 300 C, 600 C or 1,000 C.

To improve the accuracy of the sample radiance measurement and the calculated sample emissivity, any other sources of appreciable radiance such as ambient emissions or low-e mirror emissions (other than the sample itself) in the sample radiance measurement can be characterized and removed. The sample radiance includes direct sample emission 42, reflected sample emission 44, low-e mirror emission 46 and reflected ambient emission 48. The ambient emission is the background radiance if there were no sample. A critical aspect of the invention is that the ambient and low-e mirror emissions 46 and 48 are relatively low; they do not overwhelm the emissions from the sample itself. Another critical aspect is that the low-e mirror reflects its own emissions thereby approximately doubling the signal component of the radiance measurement. Consequently, the ambient and low-e mirror emissions can be removed leaving a high SNR measurement of the sample radiance, hence an accurate characterization of sample emissivity across the spectral band and temperature range.

Figure 3:
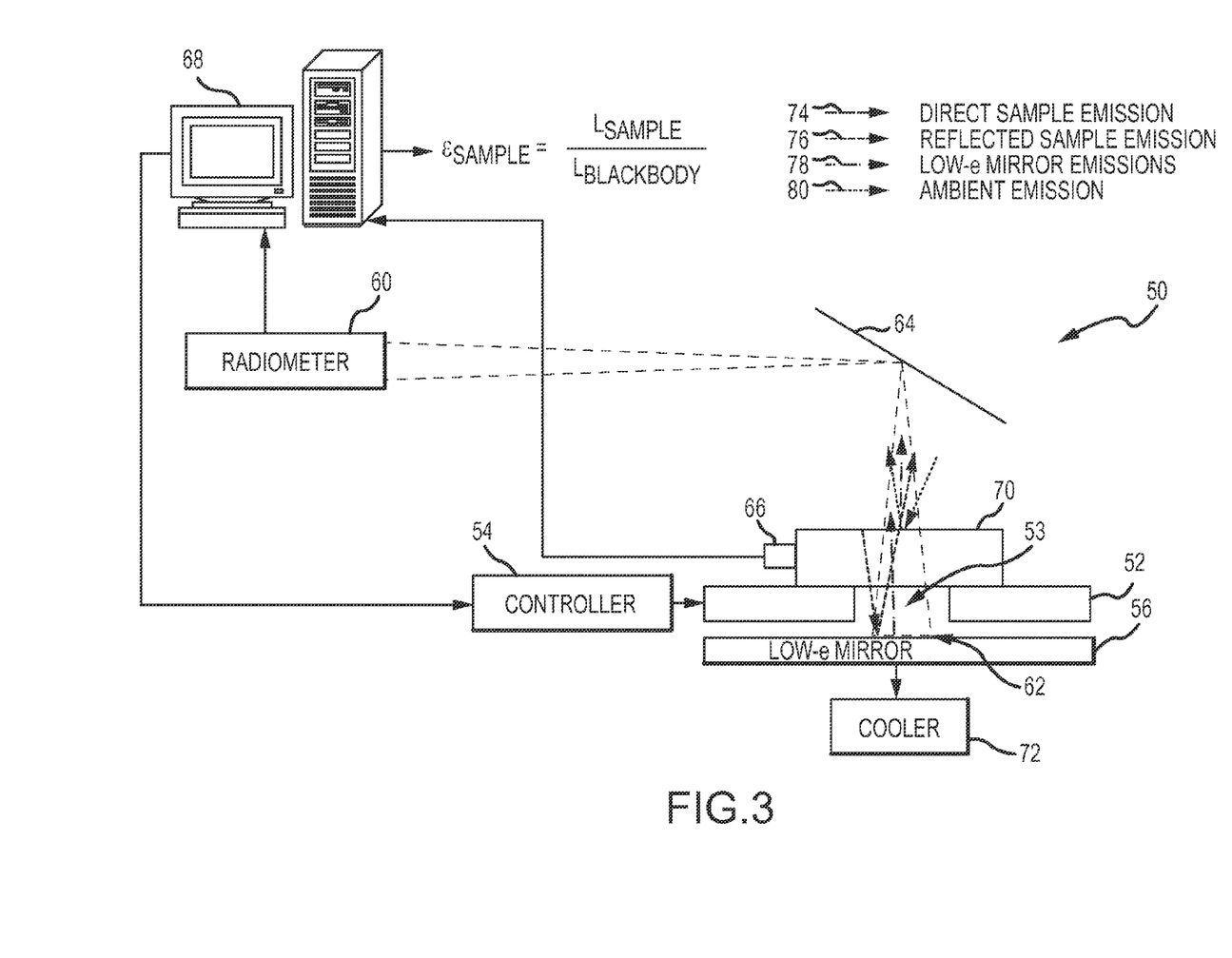
FIG. 3 is a block diagram of a second embodiment of a test assembly for characterizing the emissivity of a transmissive, low-emissivity sample in which the sample is placed on an annular hot plate and a low-e mirror is positioned behind the opening in the hot plate.

Referring now to FIG. 3, an embodiment of a test and measurement assembly 50 comprises an annular hot plate 52 having a central void 53 there through and a controller 54 for controlling the temperature of hot plate 52, a low-e mirror 56 placed behind and spaced apart from (not in thermal contact with) hot plate 52, a radiometer 60 such as a Fourier Transform IR (FTIR) radiometer for measuring radiance within a FOV 62 over a spectral band (e.g., MWIR and/or LWIR), a turn mirror 64 for turning the optical path from the hot plate to the radiometer, a temperature sensor 66 and a computer 68 configured to control controller 54, receive temperature and radiance measurements, extract a sample range and compute a sample emissivity a spectral band and temperature range.

A sample 70 is placed on annular hot plate 52 above central void 53. A portion of sample 70 and low-e mirror 56 within central void 53 overfill the FOV 62 of the radiometer. Temperature sensor 66 (e.g. a thermocouple or PRT) is attached to sample 70 to measure a sample temperature in-situ. Computer 68 issues command to controller 64 to heat hot plate 62, which in turn heats sample 70 via thermal conduction. The hot plate does not heat low-e mirror 56 via thermal conduction. Consequently the low e-mirror temperature remains at or near the ambient temperature. The emissions from the low e-mirror at ambient are markedly less than the emissions at elevated temperatures. To further reduce mirror emissions, a cooler 72 may be configured to actively cool low-e mirror 56 to temperatures below room temperature e.g. 23 C or less. Cooler 72 may comprise, for example, a liquid nitrogen bath, which could take the temperature down to approximately 77 Kelvin.

Computer 68 receives a sample radiance measurement over the FOV and spectral band and a sample temperature taken at the same time as the radiance measurement. Computer 68 extracts sample radiance from the sample radiance measurement and computes the sample emissivity over the spectral band. The computer repeats this process in increments over a temperature range, typically from approximately 50 C to 300 C, 600 C or 1,000 C.

As previously described, the sample radiance measurement includes direct sample emission 74, reflected sample emission 76, low-e mirror emission 78 and reflected ambient emission 80. To improve accuracy the ambient and low-e mirror emissions are preferably characterized and removed. The SNR of the measured sample radiance and accuracy of the sample emissivity are improved by the fact that the low-e mirror emissions are lower at ambient temperatures or actively cooled temperatures.

An embodiment for assembling the test and measurement apparatus (step 100), characterizing the optical properties of all test and measurement components (step 102), measuring sample and low-e mirror radiance over a temperature range (step 104) and computing sample emissivity (step 106) is illustrated in FIGS. 4-7.

Figure 4:
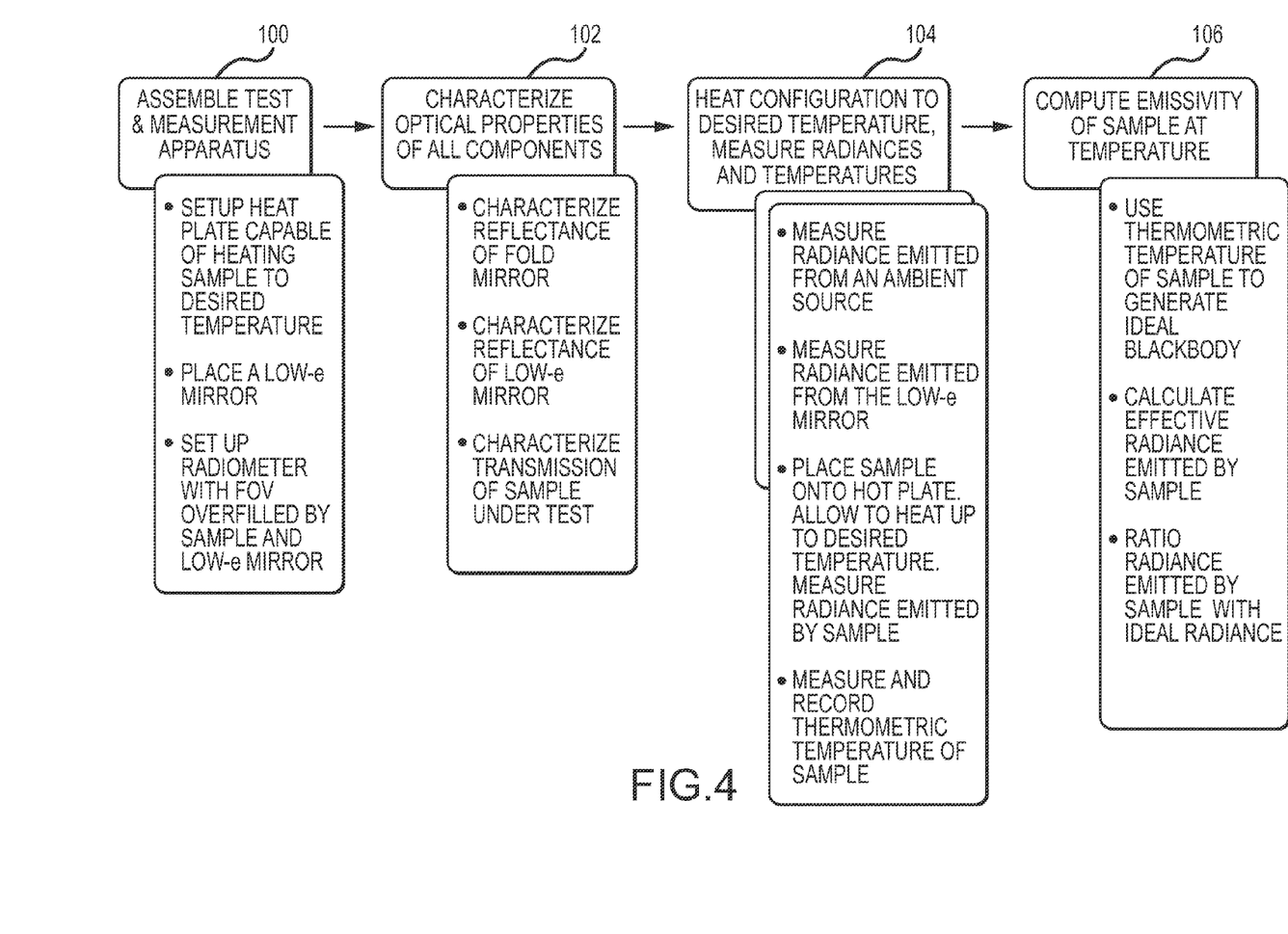
FIG. 4 is a flow diagram of an embodiment for characterizing the emissivity of sample measured against a low-e mirror background.
Figure 5A:
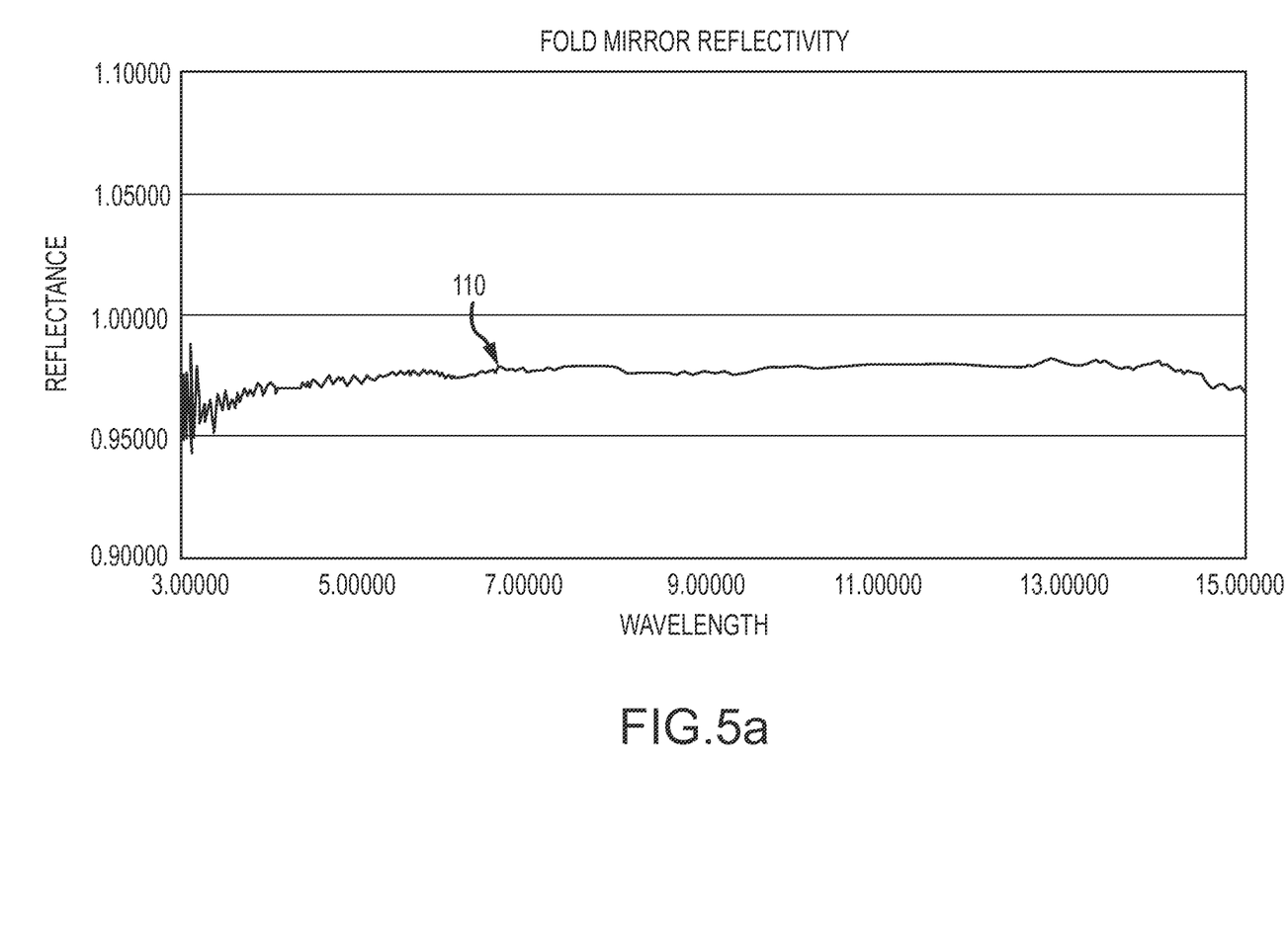
FIGS. 5a through 5c are characterization plots for reflectance of the fold mirror, reflectance of the low-e mirror and transmission of the sample, respectively.
Figure 5B:
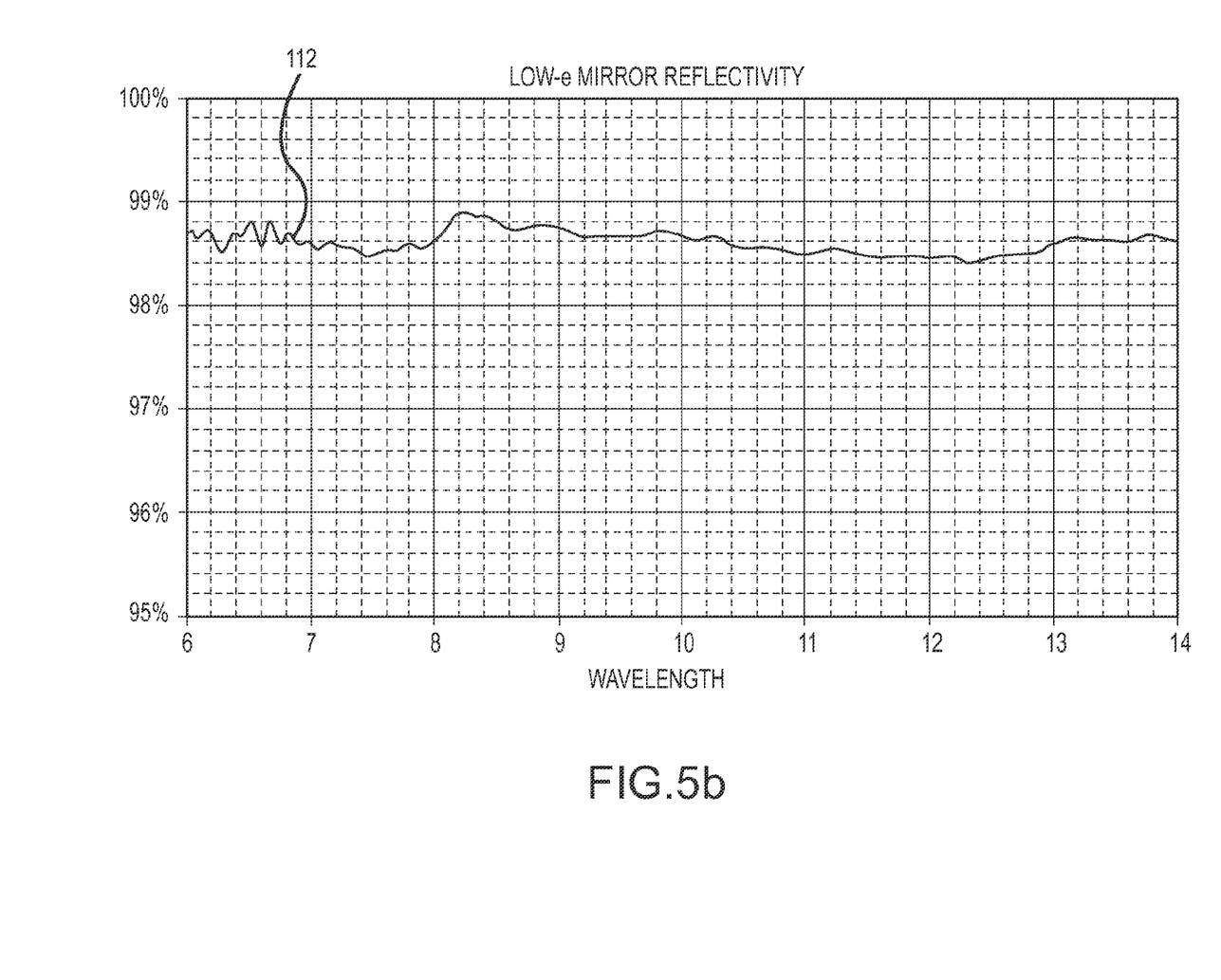
Figure 5C:
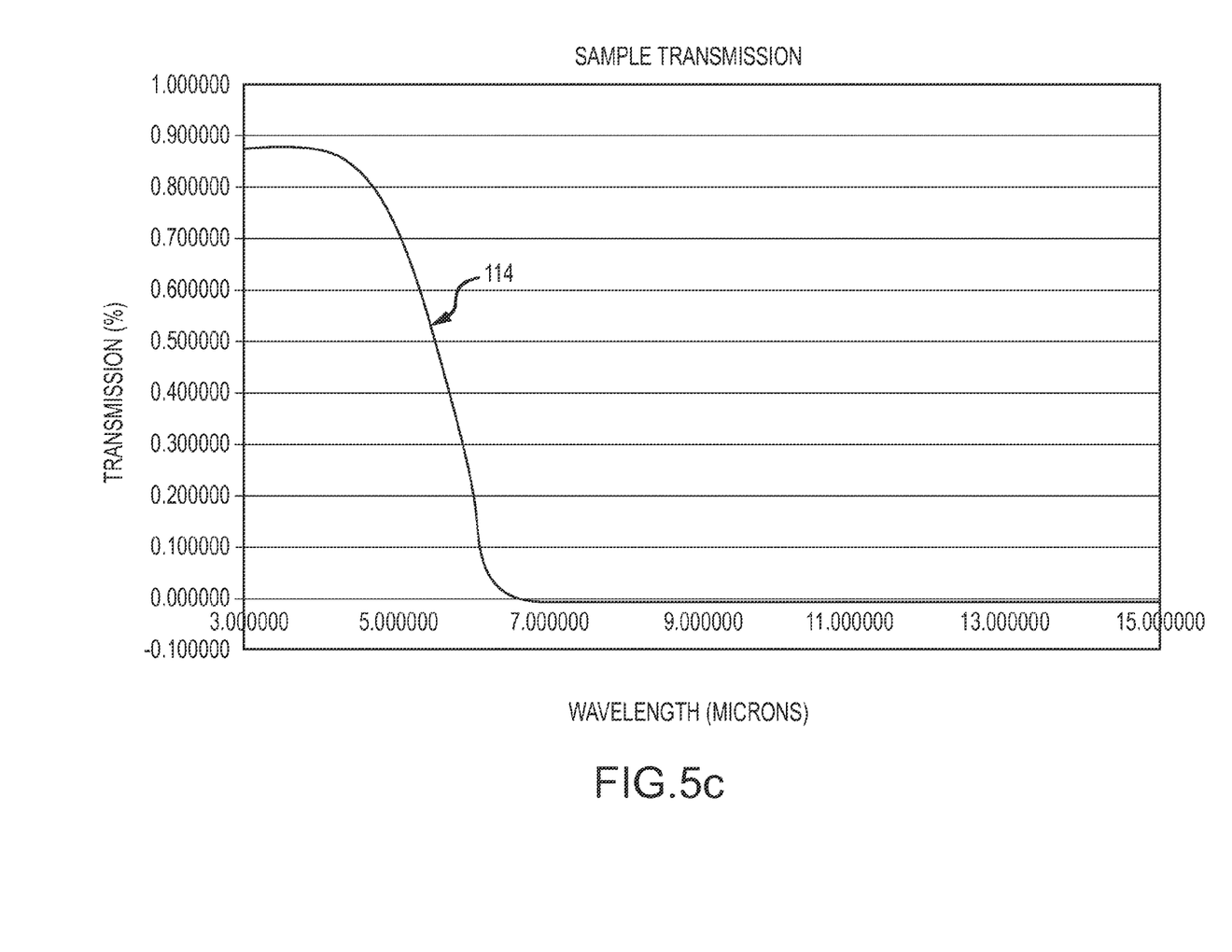

In step 100, a test & measurement apparatus such as depicted in FIG. 1 or 2 is assembled including placing a low-e mirror placing a low-e mirror behind a sample position such that the sample and the low-e mirror overfill the FOV of the radiometer. The low-e mirror provides a low emission background against which to measure sample radiance.

In step 102, a reflectance 110 of the fold mirror, a reflectance 112 of the low-e mirror and a transmission 114 of the sample under test are characterized. Reflectance is suitably characterized by measuring the radiance directly from a blackbody (a standard or blackbody simulator that has been calibrated), measuring the radiance from the blackbody reflected off of the fold mirror or low-e mirror and calculating the ratio over the spectral range. Transmission is suitably characterized by measuring the blackbody radiance and the radiance transmitted through the sample, and calculating the ratio over the spectral range. These parameters may be computed once at ambient or computed over the temperature range. The reflectance and transmittance do not change very much with temperature so in most cases a single characterization at ambient will suffice.

Figure 6:
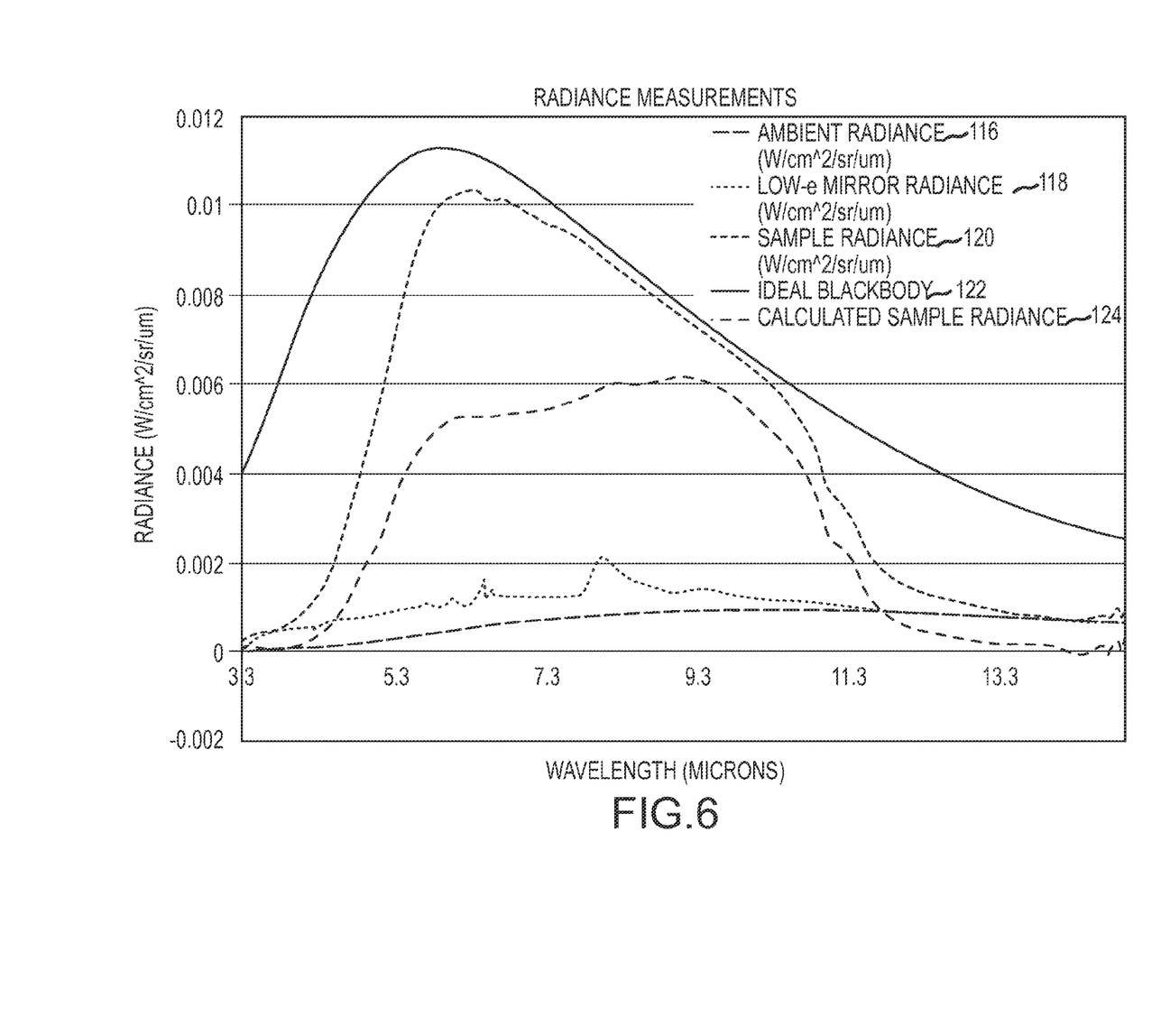
FIG. 6 is a plot of radiance measurements for ambient, the low-e mirror and the sample, a calculated sample radiance and an ideal blackbody radiance at a given temperature.

In step 104, the hot plate is heated to a desired temperature. An ambient radiance 116 and a low-e mirror radiance 118 are measured over the spectral band. The sample is placed on the hot plate and allowed to heat up to the desired temperature. A sample radiance 120 emitted by the sample is measured. At the same time the sample's thermometric temperature is measured via a temperature sensor attached to the sample. This is repeated in increments over the desired temperature range. Ambient radiance 116 may be measured only at ambient based on an assumption that heat the hot plate and sample does not change the ambient temperature appreciably.

In step 106, the computer uses the thermometric temperature of the sample to generate the ideal blackbody radiance 122 over the spectral band. The computer subtracts ambient radiance 116 from each of the low-e mirror radiance 118 and sample radiance 120. A calculated sample radiance 124 is computed as the scaled difference between these radiance measurements. The emissivity is then calculated as the ratio of the sample radiance 124 to the ideal blackbody radiance 122.

Once the data is collected in step 104, it can be reduced in step 106 by subtracting off measurements and scaling by optical constants. The radiance contributions from the three measurements can be written as, Equation 1:

$$L_1 L_{sample}\rho_{FoldMirror} +$$
$$L_{sample}\rho_{GoldMirror}\tau_{sample}\rho_{FoldMirror} +$$
$$L_{GoldMirror}\tau_{sample}\rho_{FoldMirror} + L_{ambient}$$

$$L_2 = L_{GoldMirror}\rho_{FoldMirror} + L_{ambient}$$

$$L_3 = L_{ambient} \qquad \text{Equation 1}$$

Where $L_1$ is the first radiance measurement of the ambient environment, $L_{ambient}$ is the ambient contribution to radiance, $L_2$ is the radiance measurement of the heated sample on the low-e mirror, $L_{sample}$ is the radiance from the hot sample, $\rho_{FoldMirror}$ is the reflectance of the fold mirror, $\rho_{Low-eMirror}$ is the reflectance of the low-e mirror, $\tau_{sample}$ is the transmission of the sample, $L_{Low-eMirror}$ is the radiance from the heated low-e mirror, and $L_3$ is the measurement of just the low-e mirror.

The ambient measurement can be subtracted from the first two terms to remove its contribution, Equation 2. It is important to note, as the sample and mirror increase in temperature the contribution from ambient will reduce to a negligible impact on the final result.

$$L_1' = L_1 - L_3 = L_{sample}\rho_{FoldMirror} +$$
$$L_{sample}\rho_{GoldMirror}\tau_{sample}\rho_{FoldMirror} +$$
$$L_{GoldMirror}\tau_{sample}\rho_{FoldMirror}$$

$$L_2' = L_2 - L_3 = L_{GoldMirror}\rho_{FoldMirror} \qquad \text{Equation 2}$$

The sample radiance can now be separated out by using the two equations as shown in Equation 3.

$$L'_1 - L'_2 \tau_{sample} =$$ Equation 3

$$L_{sample} \rho_{FoldMirror} + L_{sample} \rho_{GoldMirror} \tau_{sample} \rho_{FoldMirror} =$$

$$L_{sample} \rho_{FoldMirror}(1 + \rho_{GoldMirror} \tau_{sample})$$

$$L_{sample} = \frac{L'_1 - L'_2 \tau_{sample}}{\rho_{FoldMirror}(1 + \rho_{GoldMirror} \tau_{sample})}$$

From here the spectral emissivity can be calculated from the FTIR data, Equation 4, where $\varepsilon_{\lambda\_sample}$ is the spectral emissivity and $L_{blackbody}$ is the spectral radiance from a perfect blackbody.

$$\varepsilon_{\lambda\_sample} = \frac{L_{sample}}{L_{blackbody}}$$ Equation 4

Figure 7:
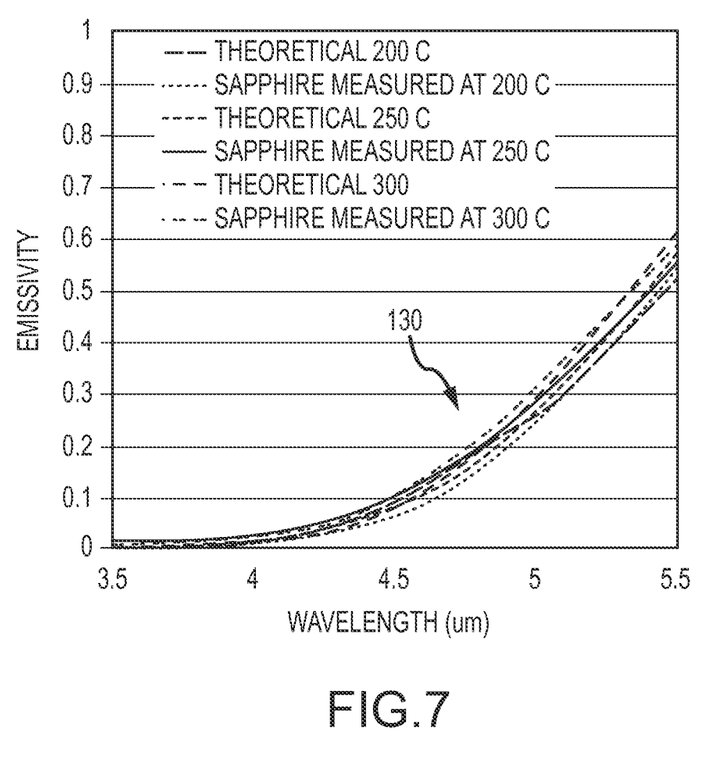
FIG. 7 is a plot comparing the characterized emissivity for three different samples versus their known emissivity.

FIG. 7 shows the measured emissivity 130 of a sapphire sample plotted with the theoretical emissivity at 200 C, 250 C and 300 C. As the optical characteristics of sapphire are well known, good agreement is expected between the two values as seen in the figure.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of characterizing the emissivity of a sample, comprising:
    a) placing a low-e mirror behind the sample, said sample and said low-e mirror positioned to overfill a field of view (FOV) of a radiometer;
    b) controlling a heat source to heat the sample through thermal conduction;
    c) using a radiometer to directly measure a sample radiance in the FOV over a spectral band that spans at least one of the MWIR and LWIR bands with the sample in-situ;
    d) measuring the temperature of the sample;
    e) computing an ideal radiance over the spectral band at the measured temperature;
    f) extracting a calculated sample radiance over the spectral band from the measured sampled radiance;
    g) computing the sample emissivity as the ratio of the calculated sample radiance to the ideal radiance over the spectral band; and
    h) repeating steps b through g at increments over a temperature range,
    wherein said low-e mirror exhibits a reflectance of at least 90% and an emissivity of at most 7.5% over the spectral band for sample temperatures over the temperature range.

2. The method of claim 1, wherein the low-e mirror exhibits a reflectance of at least 98%.

3. The method of claim 1, wherein the low-e mirror exhibits an emissivity of at most 2%.

4. The method of claim 1, wherein said low-e mirror comprises a gold coating.

5. The method of claim 1, wherein the temperature range spans 50 C to at least 300 C.

6. The method of claim 1, wherein the radiometer comprises a Fourier Transform IR (FTIR) radiometer.

7. The method of claim 1, wherein the sample is heated in-situ in an open environment without raising background radiance appreciably.

8. The method of claim 1, wherein the low-e mirror is placed between and in contact with the sample and the heat source.

9. A method of characterizing the emissivity of a sample comprising:
    a) placing a low-e mirror behind the sample, said sample and said low-e mirror positioned to overfill a field of view (FOV) of a radiometer;
    b) controlling a heat source to heat the sample through thermal conduction, wherein the heat source comprises an annular heating element having a central void therethrough, wherein the sample is placed on the surface of the annular heating element over the central void, wherein the low-e mirror is placed behind and spaced apart from the annular heating element, wherein a portion of the sample and the low-e mirror within the central void overfill the FOV of the radiometer
    c) using a radiometer to directly measure a sample radiance in the FOV over a spectral band with the sample in-situ;
    d) measuring the temperature of the sample;
    e) computing an ideal radiance over the spectral band at the measured temperature;
    f) extracting a calculated sample radiance over the spectral band from the measured sampled radiance;
    g) computing the sample emissivity as the ratio of the calculated sample radiance to the ideal radiance over the spectral band; and
    h) repeating steps b through g at increments over a temperature range,
    wherein said low-e mirror exhibits a reflectance of at least 90% and an emissivity of at most 7.5% over the spectral band for sample temperatures over the temperature range.

10. The method of claim 9, further comprising:
    actively cooling the low-e mirror.

11. A method of characterizing the emissivity of a sample, comprising:
    a) placing a low-e mirror behind the sample, said sample and said low-e mirror positioned to overfill a field of view (FOV) of a radiometer;
    b) controlling a heat source to heat the sample through thermal conduction;
    c) using a radiometer to directly measure a sample radiance in the FOV over a spectral band with the sample in-situ;
    d) measuring the temperature of the sample;
    e) computing an ideal radiance over the spectral band at the measured temperature;
    f) extracting a calculated sample radiance over the spectral band from the measured sampled radiance;
    g) computing the sample emissivity as the ratio of the calculated sample radiance to the ideal radiance over the spectral band; and
    h) repeating steps b through g at increments over a temperature range,
    wherein said low-e mirror exhibits a reflectance of at least 90% and an emissivity of at most 7.5% over the spectral band for sample temperatures over the temperature range,
    wherein the step of exacting the calculated sample radiance comprises:

characterizing the reflectance of the low-e mirror and the transmission of the sample over the spectral range;

measuring an ambient radiance emitted from an ambient source;

measuring a low-e mirror radiance emitted from the low-e mirror without the sample;

subtracting the ambient radiance from the low-e mirror radiance and the measured sample radiance; and extracting the calculated sample radiance over the spectral band as a scaled difference between the adjusted low-e mirror radiance and adjusted measured sample radiance.

* * * * *